United States Patent
Terauchi

(10) Patent No.: US 6,636,692 B1
(45) Date of Patent: Oct. 21, 2003

(54) METHOD FOR RECORDING STILL PICTURES ON DISK AND APPARATUS FOR RECORDING AND REPRODUCING STILL PICTURES ON AND FROM DISK

(75) Inventor: Ikuo Terauchi, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/382,576

(22) Filed: Aug. 25, 1999

(30) Foreign Application Priority Data

Aug. 26, 1998 (JP) .......................................... 10-239324

(51) Int. Cl.⁷ ................................................ H04N 5/91
(52) U.S. Cl. ...................................... 386/125; 386/126
(58) Field of Search ............................. 386/46, 47, 70, 386/94, 95, 125, 126, 121

(56) References Cited

U.S. PATENT DOCUMENTS

| | | | | |
|---|---|---|---|---|
| 4,982,291 A | * | 1/1991 | Kurahashi et al. | 386/70 |
| 5,561,649 A | * | 10/1996 | Lee et al. | 386/47 |
| 5,619,571 A | | 4/1997 | Sandstrom et al. | |
| 6,393,201 B1 | * | 5/2002 | Sukuramoto et al. | 386/95 |

FOREIGN PATENT DOCUMENTS

| | | |
|---|---|---|
| EP | 0 336 317 | 10/1989 |
| EP | 10075340 | 3/1998 |

* cited by examiner

*Primary Examiner*—Huy Nguyen
(74) *Attorney, Agent, or Firm*—Parkhurst & Wendel, L.L.P.

(57) ABSTRACT

An apparatus for recording and reproducing still pictures on and from a disk according to the invention comprises a still picture recording and reproducing means for recording a still picture in a particular position of a still picture recording region according to the last recording position information recorded in a recording position information sector specified by a pointer sector read out from the disk, and a still picture recording position information recording and reproducing means which, while managing a plurality of recording position information sectors so as to prevent the recording frequency of a recording position information sector from exceeding the maximum recording frequency, updates the recording position information about said still picture and the recording frequency of said recording position information sector and records them in the same or different recording position information sector, and which, when the recording position information is recorded in said different recording position information sector, updates said pointer sector on the information which specifies this recording position information sector. Thus, this apparatus shortens the time for retrieval of a still picture recording region of a disk limited in recording frequency and improves the recording frequency of the disk and ensures a reliable recording operation.

10 Claims, 7 Drawing Sheets

METHOD FOR RECORDING STILL PICTURES ON DISK AND APPARATUS FOR RECORDING AND REPRODUCING STILL PICTURES ON AND FROM DISK

FIELD OF THE INVENTION

The present invention relates to a method for recording still pictures on a disk which is limited in recording frequency, and also to an apparatus for recording and reproducing still pictures on and from a disk by using the disk as a recording medium.

BACKGROUND OF THE INVENTION

Tapes which have heretofore been used as a picture recording medium have been superseded by picture recording and reproducing apparatus for recording and reproducing picture signals using writable disks to record or reproduce picture signals, which apparatus have begun to appear on the market. Disks to be used are, for example, hard disks and optical disks, such as MO (magneto-optical disk) and DVD-RAM (digital versatile disk-random access memory).

Among the features of the disks, the one that deserves the first mention is rapid accessibility. Without the need of rewinding as in a tape, any region can be rapidly accessed by simply moving the head over the disk, a great merit from the viewpoint of retrieval.

Another feature is that the disk is suitable for recording still pictures. To record or reproduce still pictures, it is necessary to continue scanning the same recording track on the recording medium, but the tape medium is unsuitable for such operation. In this respect, a non-contact recording medium, such as an optical disk, is of particular merit. The reason is that in the case of the tape medium, the tape contacts the head, failing to endure a prolonged tracking operation.

Fully utilizing the two features of the disk, i.e., the suitability for still picture recording and the rapid accessibility, the apparatus for recording and reproducing still pictures on and from the disk has begun to be widely used in various fields, for picture filing in the medical field and for data preservation in the field of scientific research.

Consider the differences between the tape medium and the disk medium as to the manner of repetitive recording operation in which after one recording has ended, another is effected and so on. In the case of the tape medium, when recording is to be resumed after the end of the preceding recording has ended, the operation may be directly started. Since the physical structure of the tape medium is such that the preceding last recording position can be physically retained even if the recording operation is interrupted by turning off the power or taking out the tape, the subsequent recording can be made on the tape by simply starting to record, without any trouble.

In the case of the disk medium, however, if the recording head remains stopped at the preceding last recording position, it is possible to resume recording from said position. However, once the power has been turned off or the disk has been taken out, the last recording position does not physically remain where it was, getting lost, so that it is impossible to resume recording from the position at which the preceding recording has ended.

Therefore, in disk machines and instruments, it is necessary to somehow know the last recording position in the preceding recording operation before fresh recording. In conventional disk machines and instruments, when the power is turned on or the disk is inserted, the recorded region of the disk is retrieved by making a check on the presence or absence of recorded data so as to retrieve the last recording position; in this way, the process for managing the last recording position has been performed.

Further, a method would be contemplated of writing the last recording position on the disk itself at all times. This method, however, has not been realized. The reason is that as it becomes a problem particularly with optical disks limited in recording frequency, once a picture is recorded, the last position information stored in the disk has to be rewritten, whereby the writing frequency of the recording position information writing region materially increases; thus, the limit of the recording frequency will soon be exceeded. Particularly when still pictures are to be recorded, since the recording position information has to be updated for each still picture, the limit of the recording frequency will soon be exceeded. Therefore, a procedure has been adopted in which the last recording position information is not written on the disk and instead a memory which is not limited in recording frequency is used so that the last recording position information may be written in the memory installed in disk machines and instruments, thereby avoiding this problem.

However, the arrangement of conventional disk machines and instruments presents the following problems.

A problem associated with a method of retrieving the recording region in the disk as when the power is turned on is that a large amount of time is expended for retrieval.

Further, a method of storing the last recording position information in the memory installed in conventional disk machines and instruments, though useful for machines and instruments which use an unremovable medium, such as a hard disk, is not suitable for machines and instruments which allow exchange of disks, such as optical disks. Furthermore, in this case, the disk and the internal memory which records the recording position information correspondingly thereto independently exist in separate places. Therefore, the disappearance of the memory information caused as by the power being cut off causes the loss of the relation of one-to-one correspondence between the disk and the machine or instrument and hence the loss of the last recording position information, a situation which could lead to erroneously erasing the pictures recorded on the disk, which is a fatal problem.

DISCLOSURE OF THE INVENTION

The present invention has for its object the provision of a method for recording still pictures on a disk, which shortens the period of time for retrieving a region where a picture is recorded in a disk limited in recording frequency and which improves the recording frequency and ensures a reliable recording operation.

To achieve this object, the invention provides a method for recording still pictures on a disks wherein in recording still pictures on a disk limited in recording frequency, the method comprises the steps of forming said disk with a still picture recording region for recording still pictures, a plurality of recording position information sectors in which recording position information indicating the position of a still picture to be recorded on the disk is recorded, and a pointer sector which specifies a recording position information sector having the last recording position information written therein, when it is desired to record a still picture, recording it in a particular position in said still picture recording region according to the last recording position information written in a recording position information sector specified by said pointer sector, managing said plurality of recording position information sectors so as to prevent the recording frequency of a recording position information sector from exceeding the maximum recording frequency, updating the recording position information about said still picture and the recording frequency of said recording position information sector and recording them in the same or different recording position information sector, and, when the recording position information is recorded in said different recording position information sector, updating said pointer sector on the information which specifies this recording position information sector.

According to the above arrangement, the time for retrieval of a still picture recording region of a disk limited in recording frequency is shortened, the recording frequency of the disk is improved to the greatest degree, and a reliable recording operation is ensured.

Further, another method for recording still pictures on a disk according to the invention, different from the one described above, is a method wherein in recording still pictures on a disk limited in recording frequency, the method comprises the steps of forming said disk with a still picture recording region for recording still pictures, a plurality of recording position information blocks in which recording position information indicating the position of a still picture to be recorded on the disk is recorded in a particular one of a predetermined number of sectors, and a pointer block whereby information which specifies a recording position information block having the last recording position information written therein is recorded in a particular one of a predetermined number of sectors, when it is desired to record a still picture, recording in a particular position in said still picture recording region according to the last recording position information written in a particular sector of a recording position information block specified by said pointer block, managing said plurality of recording position information blocks so as to prevent the recording frequency of a recording position information block from exceeding the maximum recording frequency, updating the recording position information about said still picture and the recording frequency of said recording position information block and recording them in a sector of the same or different recording position information block, and, when the recording position information is recorded in said different recording position information block, updating said pointer sector on the information which specifies this recording position information block.

According to the above arrangement, with a disk such as a DVD-RAM which is limited in recording frequency and adapted to read and write data on a sector basis, such as information on still pictures or recording positions, on the basis of a block consisting of a predetermined number of sectors, it is possible to shorten the time for retrieval of a still picture recording region, to improve the recording frequency of the disk to the greatest degree, and to ensure a reliable recording operation.

The invention provides an apparatus for recording and reproducing still pictures on and from a disk by using a disk limited in recording frequency as a recording medium, said apparatus comprising a still picture recording and reproducing means for recording a still picture in a particular position of a still picture recording region according to the last recording position information recorded in a recording position information sector specified by a pointer sector read out from the disk, and a still picture recording position information recording and reproducing means which, while managing a plurality of recording position information sectors so as to prevent the recording frequency of a recording position information sector from exceeding the maximum recording frequency, updates the recording position information about said still picture and the recording frequency of said recording position information sector and records them in the same or different recording position information sector, and which, when the recording position information is recorded in said different recording position information sector, updates said pointer sector on the information which specifies this recording position information sector.

According to the above arrangement, recording position information can be distributively recorded in a plurality of recording position information sectors, in consideration of the limitation of the recording frequency of the disk, and the last recording position can be reliably recorded on the disk while preventing a breakdown of the recording position information sectors.

Further, in the case where said still picture recording position recording and reproducing means is arranged such that let the maximum number of still pictures recordable on the disk be L (which is a positive integer), the recording limit frequency of the disk be M (which is a positive integer), and the maximum recording frequency of a single recording position information sector be N (which is an integer between 1 and M), and let the total number Q of recording position information sectors be a value calculated from the equation $Q \geq (N \times L/M)$, then, if the total number Q is a number containing a decimal point, the number is rounded up to the nearest integer and an integer equal to or greater than said nearest integer is used as the value of Q. In this case, the last recording position information can be recorded in an optimum manner, so that a breakdown of records can be prevented until all recording position information sectors reach the maximum recording frequency, ensuring that the last recording position is reliably recorded.

Further, in the case where said still picture recording position recording and reproducing means is arranged such that a group of recording position information sectors and a pointer sector are formed between a first still picture recording region formed on the inner peripheral side of the disk and a second still picture recording region formed on the outer peripheral side of the disk and equidistantly or substantially equidistantly from the outer and inner peripheral ends of the disk. In this case, increase of the average seek time for the head of the disk drive is prevented and the time to be taken for the recording of a still picture and the recording of recording position information can be minimized throughout the disk.

Further, the invention provides another apparatus for recording and reproducing still pictures on and from a disk by using a disk limited in recording frequency, different from the one described above, said apparatus comprising an input/output processing means for recording and reproducing data on a sector basis, such as a still picture or recording position information, on said disk on the basis of a block which consists of a predetermined number of sectors, a still picture recording and reproducing means which, when recording a still picture, instructs said input/output processing means to record a still picture in a particular position of the still picture recording region specified by a particular sector of the pointer block read out from the disk, and a still picture recording position information recording and reproducing means which, while managing a plurality of recording position information blocks so as to prevent the recording frequency of a recording position information block from exceeding the maximum recording frequency, instructs said input/output processing means to update the recording position information about said still picture and the recording frequency of said recording position information block and to record them in a sector of the same or different recording position information block, and which, when the recording position information is recorded in said different recording position information block, instructs said input/output processing means to update said pointer block on the information which specifies this recording position information block.

According to this arrangement, even with a disk such as a DVD-ROM adapted for reading and writing data on a sector basis, such as information on still pictures or recording positions, on the basis of a block consisting of a predetermined sectors, it is possible to distributively record recording position information in a plurality of recording position information blocks, and to reliably record last recording position information on the disk, while preventing a breakdown of the records in the recording position information blocks.

Further, in the case where said still picture recording position recording and reproducing means is arranged such that let the maximum number of still pictures recordable on the disk be L (which is a positive integer), the recording limit frequency of the disk be M (which is a positive integer), and the maximum recording frequency of a single recording position information block be N (which is an integer between 1 and M), and let the total number Q of recording position information blocks be a value calculated on the basis of the equation $Q \geq (N \times L/M)$, then if the total number Q is a number containing a decimal point, the number is rounded up to the nearest integer and an integer equal to or greater than said nearest integer is used as the value of Q. In this case, the last recording position information can be recorded in an optimum manner and occurrence of a breakdown of records can be prevented until all recording position information blocks reach the maximum recording frequency, ensuring reliable recording of the last recording position information.

Further, in the case where the input/output processing means is arranged to record and reproduce data, such as a still picture or recording position information, on and from the disk on an ECC block basis. In this case, even if a disk adapted for recording on an ECC block basis, such as a DVD-RAM, is used, the last recording position information can be reliably recorded.

Further, in the case where said still picture recording position recording and reproducing means is arranged such that a pointer block and a group of recording position information blocks are formed between a first still picture recording region formed on the inner peripheral side of the disk and a second still picture recording region formed on the outer peripheral side of the disk and equidistantly or substantially equidistantly from the outer and inner peripheral ends of the disk. In this case, increase of the average seek time for the head of the disk drive is prevented and the time to be taken for the recording of a still picture and the recording of recording position information can be minimized throughout the disk.

In the case where said still picture recording and reproducing apparatus is provided with a use limit frequency setting means which sets a maximum recording frequency for the disk, use limit frequencies may be set according to the performance of disks to be used and user's desire.

DESCRIPTION OF EMBODIMENTS
(First Embodiment)

Figure 1:
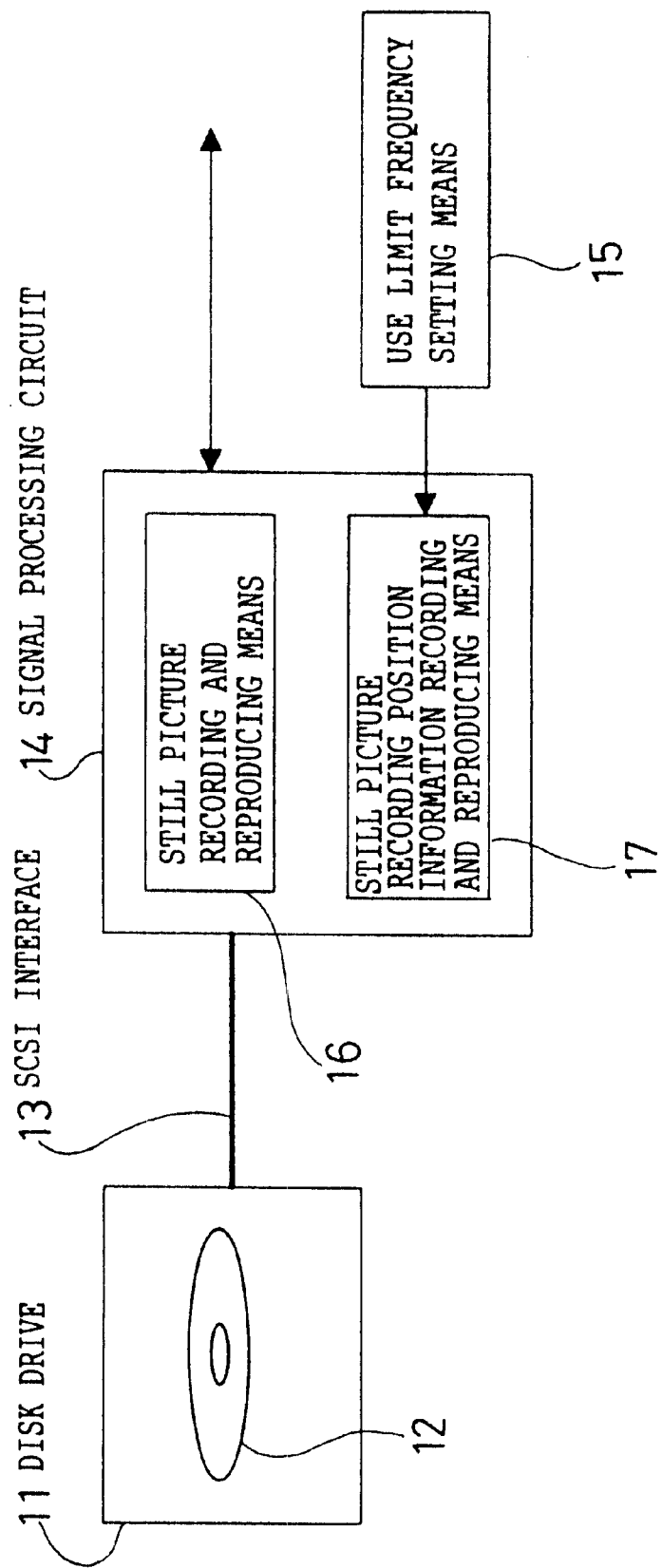
FIG. 1 is a block diagram of an apparatus for recording and reproducing still pictures on and from a disk according to a first embodiment of the present invention.

An apparatus for recording and reproducing still pictures on and from a disk according to a first embodiment of the present invention, as shown in FIG. 1, comprises a disk drive 11, an SCSI interface 13 which effects command transfer and data transfer to the disk drive 11, a signal processing circuit 14 which effects recording and reproducing through the SCSI interface 13, and a use limit frequency setting means 15 for setting the use limit frequency N.

The signal processing circuit 14 comprises a still picture recording and reproducing means 16 which records a still picture at a particular position in a still picture recording region according to the last recording position information stored in a recording position information sector which is specified by a pointer sector read out from a disk 12 when a still picture is to be recorded, and a still picture recording position information recording and reproducing means 17 which, while managing a plurality of recording position information sectors so as to prevent the recording frequency of a recording position information sector from exceeding the maximum recording frequency assigned to the recording position information sector, updates the recording position information about said still picture and the recording frequency of said recording position information sector and records them in the same or different recording position information sector and which, when the recording position information is recorded in said different recording position information sector, updates said pointer sector on the information which specifies this recording position information sector.

In the case of SCSI commands used for the SCSI interface 13, a command to write and read out data on and from the disk is executed on a sector basis. For example, when it is desired to record data, this is effected by designating the address of the leading sector where it is desired to record data, and the number of sectors starting at said leading sector. For example, a command is issued to record in 300 sectors starting at the sector address 150. Thus, recording on a sector basis is made possible through the SCSI interface 13.

First, the disk 12 on which it is intended to record still pictures and which is unformatted and limited in recording frequency is formatted by the still picture recording position information recording and reproducing means 17. At this time, the use limit frequency N which shows how many times the disk 12 is to be used by overwriting is inputted into the use limit frequency setting means 15 by the user. The still picture recording position information recording and reproducing means 17 calculates the total number Q of recording position information sectors, as from the use limit frequency N (to be later described). This disk 12 is formatted as shown in FIGS. 2 and 3.

Figure 2:
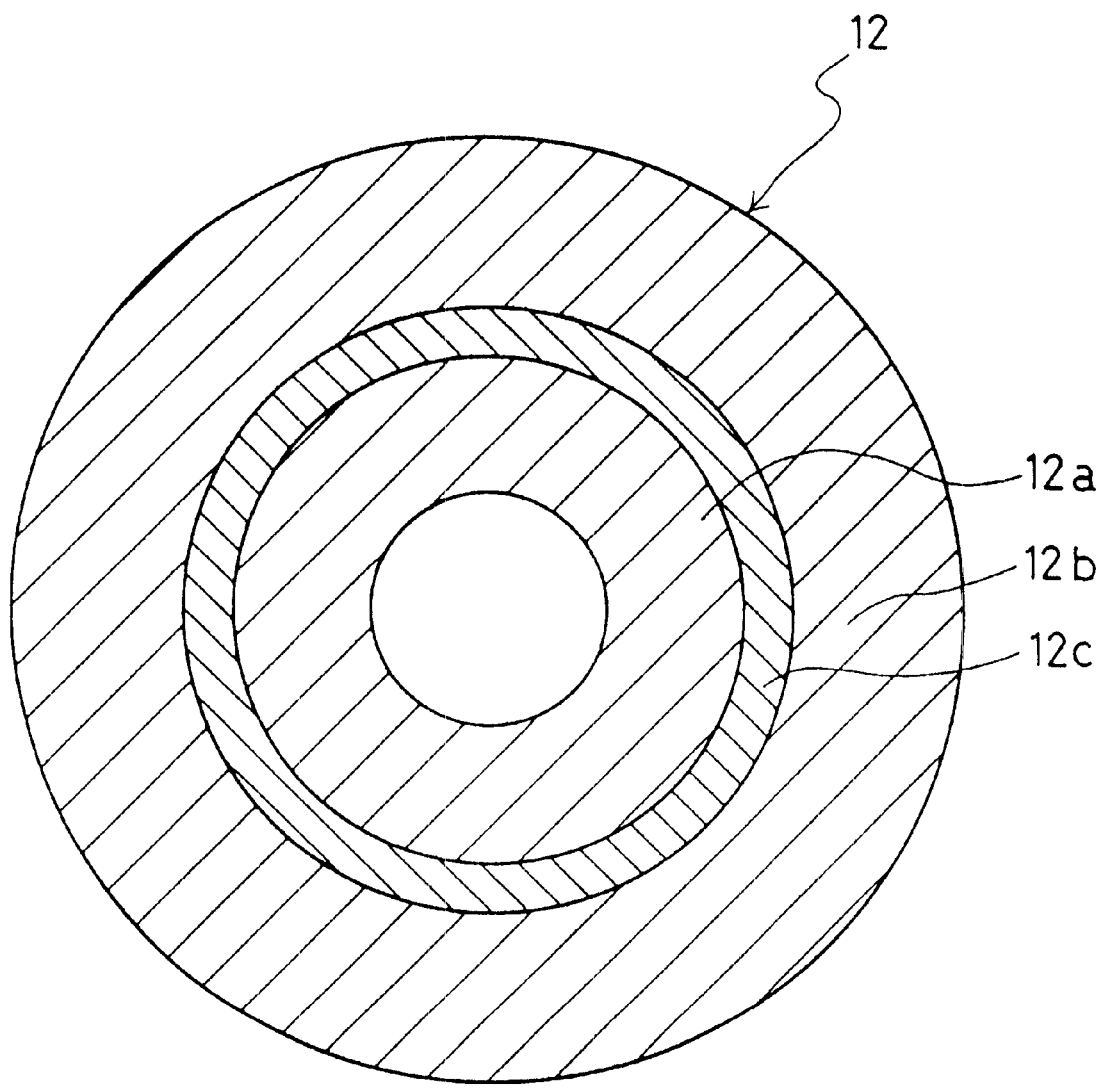
FIG. 2 is a complete view of the disk in the first embodiment 1.

This disk 12, as shown in FIG. 2, is formed with a still picture recording region 12a serving as a first still picture recording region on the inner peripheral side of the disk 12, a still picture recording region 12b serving as a second still picture recording region on the outer peripheral side of the disk 12, and a region 12c comprising a pointer sector and a group of recording position information sectors and disposed between said still picture recording regions 12a and 12b and equidistant or substantially equidistant from the outer and inner peripheral ends of the disk 12.

Figure 3:
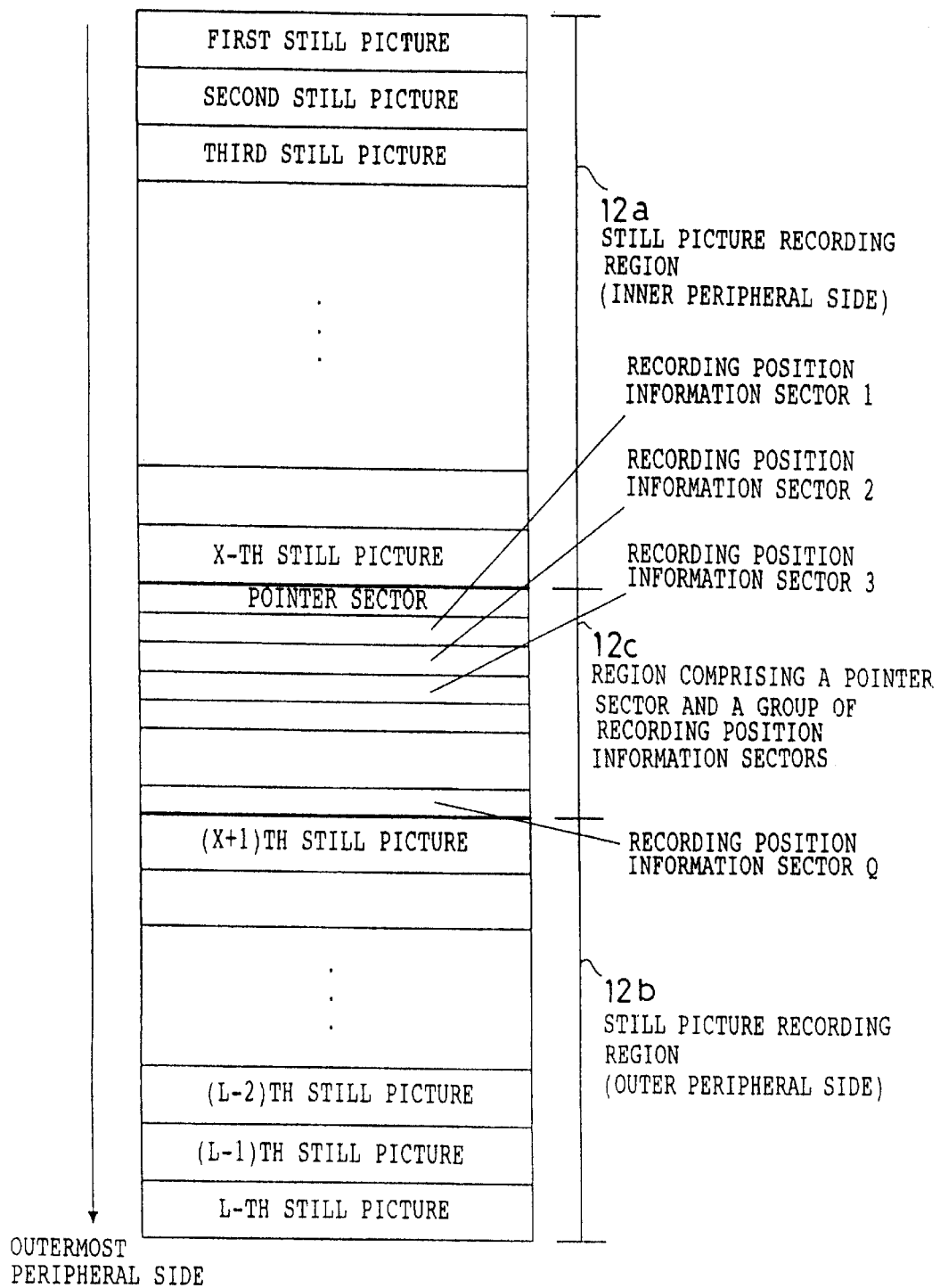
FIG. 3 is a schematic view showing the data arrangement of the disk in the first embodiment.

The data arrangement of the disk 12 is shown in FIG. 3. For example, still picture recording regions 12a and 12b for recording the first to Lth still pictures as seen from the outermost to the innermost peripheral side are provided and so is a region 12 consisting of a pointer sector and Q recording position information sectors, all of said sectors being interposed between the Xth still picture and the (X+1)th still picture.

Let the maximum number of still pictures which can be recorded on the disk 12 be L (which is a positive integer) as shown in FIG. 3, and the recording limit frequency of the disk 12 be M (which is a positive integer). In the case of optical disks, generally the recording limit frequency is from one hundred thousand to five hundred thousand for DVD-RAMs and one million or thereabouts for magneto-optical disks. What is meant by "recording limit frequency" is that, for example, if recording is repetitively made this number of times on one and the same region, the recording layer on the recording surface of the disk 12 is deteriorated to the extent that no further correct recording is possible. Therefore, the repetitive recording frequency has to be kept within the frequency limit.

Five hundred thousand may sound to be a sufficient number of times of recording as compared with a tape medium; however, consider a case where L is set to 5,000 and a single recording position information sector alone is prepared, so that each time a still picture is recorded, the position is updated and recorded in the recording position information sector. Thus, each time a single picture is recorded, the relevant recording position is recorded in the recording position information sector. As for the recording position information, there may be contemplated, e.g., a still picture number which indicates how many sector addresses or still pictures have been recorded on the disk 12. In the above case, at the point of time when 5,000 still pictures have been recorded on the disk 12, it follows that in spite of the fact that recording has been made only once in the still picture recording region, recording has been made 5,000 times in the recording position information sector. If recording is made 100 times in the still picture recording region, the recording frequency of the recording position information sector is as shown by Eq. 1 below.

$$5{,}000 \text{ times} \times 100 \text{ times} = 500{,}000 \text{ times} \qquad (1)$$

Thus, the recording position information sector cannot allow any more recording. If any more still picture were recorded, the record in the recording position information sector would break down and hence the recording position information management would also break down. That is, if said method is used, recording can be made only 100 times in the still picture recording region when the disk has the ability to have 500,000 times of recording made thereon.

Accordingly, a plurality of recording position information sectors are provided as a group of recording position information sectors as shown in FIG. 3, thereby increasing the number of repetitions of recording in the still picture recording region. However, simply increasing the number of recording position information sectors does not mean that it is possible to easily find which sector is used. Thus, there is provided a pointer sector adapted to indicate which recording position information sector in the group of recording position information sectors is being used, so as to achieve an increased rate of access to the group of recording position information sectors.

In the invention, it may be contemplated to increase the recording frequency of the still picture recording region to a maximum recording limit frequency M. However, there may be a user who, under usual working conditions, will not repetitively use the disk 12 to the extent of the recording limit frequency. Therefore, what is called the use limit frequency N of the disk 12 is newly defined here. Since the use limit frequency N should not exceed the recording limit frequency M, it follows that N should be an integer between 1 and M.

The maximum recording frequency of a single recording position information sector and the total number Q of recording position information sectors constituting the group of recording position information sectors will now be defined. First, the maximum recording frequency of a single recording position information sector must be kept at not more than M in order to prevent a breakdown of records. And the total number Q of recording position information sectors constituting the group of recording position information sectors can be found as follows.

That the use limit frequency of the disk 12 is N means that L still pictures are recorded N times. And if there is only one recording position information sector available, N×L times of writing have been made in that sector after use has been made N times as in the above example. Since it is up to only the recording limit frequency M that writing can be made in the recording position information sector, such writing is shared among the Q recording position information sectors and hence Eq. 2 holds.

$$Q \times M = N \times L \qquad \text{Eq. 2}$$

Therefore, the total number Q of recording position information sectors is given by Eq. 3.

$$Q = N \times L / M \qquad \text{Eq. 3}$$

The total number of recording position information sectors must be an integer. If, therefore, this total number Q is indivisible, giving a number containing a fractional part, the number is rounded up to the nearest integer.

Further, the total number Q of recording position information sectors is equal to or greater than the smallest number which satisfies Eq. 3; therefore, Eq. 4 holds.

$$Q \geq N \times L / M \qquad \text{Eq. 4}$$

As a numerical example, let L be 5,000 still pictures, M be 500,000 times, N be 30,000 times, and substitute them in Eq. 4, and the number Q of sectors forming the group of recording position information sectors is obtained as follows.

Q ≥ 30,000 times×5,000 pictures/500,000 times=300 sectors. In this example, it is seen that the total number of recording position information sectors required is 300 or more.

Actually, the Q=300 recording position information sectors are used such that recording is made 500,000 times or less in each recording position information sector. That is, when recording has been made a maximum of 500,000 times in one recording position information sector, another sector in the group of sectors is employed. In this case, it is arranged that the pointer sector always indicates the recording position information sector which is now in use. However, the data in the pointer sector is updated only when the recording position information sector now in use has been replaced by another recording position information sector.

As shown in FIG. 2, the pointer sector and the group of recording position information sectors are disposed in an intermediate annular region 12c of the disk 12. The still picture recording position information must be updated and recorded in the recording position information sector each time a still picture has been recorded. Since the still picture recording region lies over substantially all area of the disk 12, a seek operation for moving the head of the disk drive 11 is necessary in order to record the recording position information about a still picture after the latter has been recorded. In the case of an optical disk, the time required for the seek operation of the head is considerably long as compared with the time required for recording operation. The time required for recording a single still picture is (still picture recording time+seek time+still picture position information recording time), in which the seek time is the longest; thus, to minimize the required time, it is necessary to minimize the average seek time with respect to the recording of all still pictures on the disk 12. Accordingly, the pointer sector and the group of recording position information sectors are disposed adjacent the intermediate annular region of the disk 12, thereby minimizing the average seek time. If, for example, the pointer sector and the group of recording position information sectors are disposed adjacent the inner annular region of the disk 12, the time required for recording still pictures in the inner annular region is short while it takes a long time to record still pictures in the outer annular region, thus creating imbalance.

The operation of recording still pictures on the disk 12 limited in recording frequency using this still picture recording and reproducing apparatus will now be described.

As described above, an unformatted disk 12 is formatted in advance by the still picture recording position information recording and reproducing means 17.

In formatting the disk 12, the use limit frequency N indicating how many times the disk is to be overwritten is inputted into the use limit frequency setting means 15 by the user, and the total number Q of recording position information sectors is found from Eq. 4. And as shown in FIG. 2, the pointer sector and the group of recording position information sectors consisting of Q recording position information sectors are formed in the region 12c adjacent the intermediate annular region of the disk 12. The information that the first recording position information sector is being used is written in the pointer sector, and the recording frequency of the recording position information sector (in this case, the recording frequency is 1) and the still picture recording position information to be recorded first are written in the first recording position information sector. In this way, the formatting of the disk 12 is completed.

To record still pictures, first, the pointer sector in the disk 12 is read out by the still picture recording position information recording and reproducing means 17 so as to detect which recording position information sector in the group of recording position information sectors is being used. Thereafter, the recording position information sector indicated by the pointer sector is read out to obtain the information about the position at which a still picture is to be recorded and the recording frequency. The data are fed from the still picture recording and reproducing means 16 to the disk 12 through the SCSI interface 13, and a still picture is recorded at a particular position in the still picture recording region 12a or 12b of the disk 12. Thereafter, the data in the recording position information sector is updated by the still picture recording position information recording and reproducing means 17. For example, suppose that the second writing has been made in the recording position information sector. Then, the recording frequency of 2 and the still picture recording position information to be recorded secondly, which are updated items of information, are recorded in the same recording position information sectors.

Thus, by performing the operation of detecting the recording position information prior to the recording of a still picture and ascertaining the particular position in the still picture recording region in which to record a still picture and the recording frequency of the recording position information sector, the recording position information and the recording frequency of the recording position information sector are ascertained at all times.

Further, it is arranged that at the point of time when the recording frequency of the recording position information sector has reached M, the next recording position information sector will be used thenceforth in place of the one that has been used up to now. Thus, updating and recording is made in the pointer sector so that the pointer sector will designate the next recording position information sector.

With the arrangement thus made, it is possible to detect the recording information recorded in the recording position information sector formed in the disk 12 to ascertain the particular position in the still picture recording region in which to record a still picture, thereby making it unnecessary to retrieve the still picture recorded in the still picture recording region so as to retrieve a recordable particular position, as in the prior art, and making it possible to shorten the retrieving time for retrieving a particular position in the still picture recording region 12a or 12b for recording still pictures.

Further, in the disk 12 limited in recording frequency, the recording position information can be recorded distributively in a plurality of recording position information sectors and the last recording position information can be reliably recorded in the disk 12 while preventing breakdown of the record in the recording position information sector. Thus, the last recording position can be known at all times, whereby still pictures can be reliably recorded in the disk 12.

Further, since the still picture recording position information recording and reproducing means 17 is arranged such as to determine the total number Q of recording position information sectors on the basis of said Eq. 4, the last recording position information can be recorded in an optimum manner, making it possible to prevent occurrence of a breakdown of records until all recording position information sectors reach the maximum recording frequency. Further, the disk can be used with its maximum recording frequency increased up to the recording limit frequency.

Further, since the still picture recording position information and reproducing means 17 is arranged such that the group of recording position information sectors and the pointer sector are disposed between the still picture recording region 12a on the inner peripheral side of the disk 12 and the still picture recording region 12b on the outer peripheral side of the disk 12 and at positions equidistant or substantially equidistant from the outer and inner peripheral ends of the disk 12, the average seek time for the head of the disk drive 11 can be reduced and the time to be taken for the recording of still pictures and the recording of recording position information can be minimized throughout the area of the disk 12.

(Second Embodiment)

Figure 4:
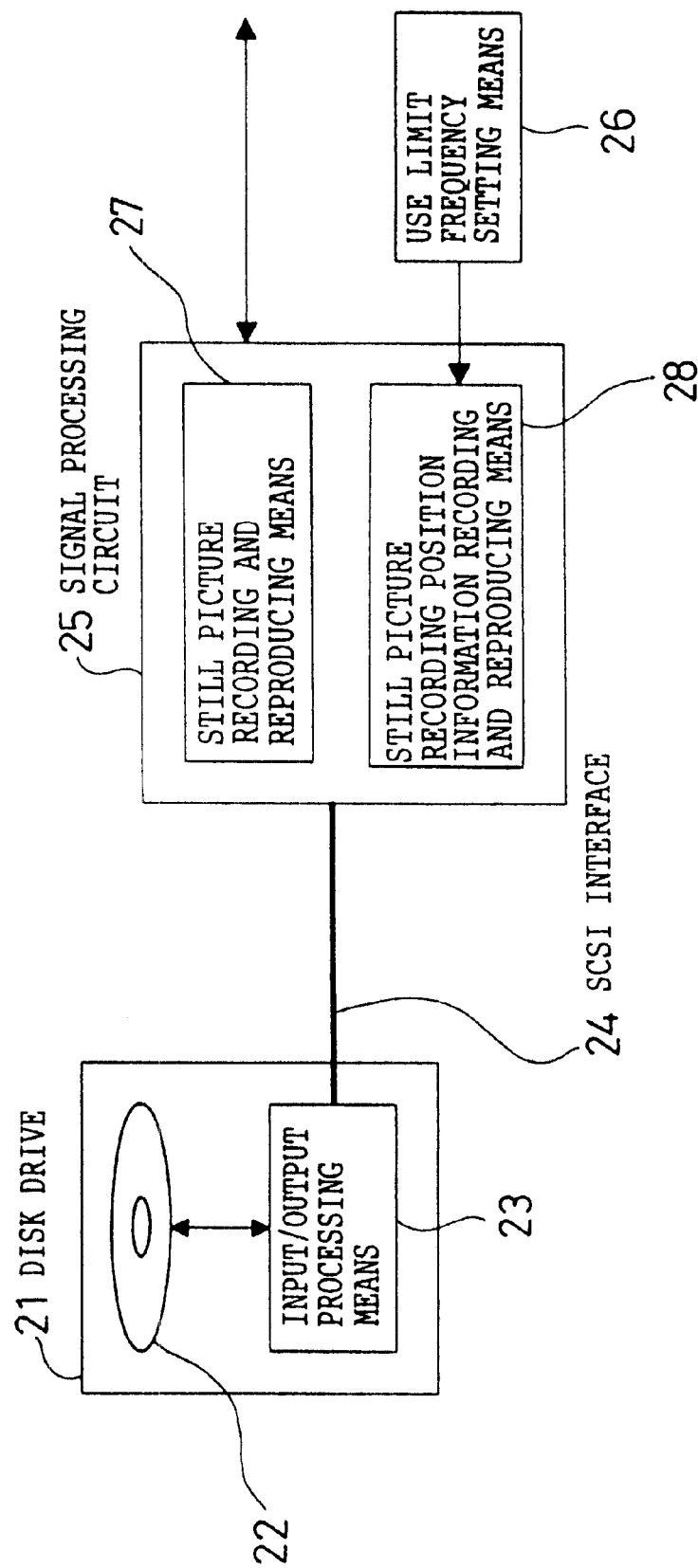
FIG. 4 is a block diagram of an apparatus for recording and reproducing still pictures on and from a disk according to a second embodiment of the present invention.

An apparatus for recording and reproducing still pictures on and from a disk according to a second embodiment of the present invention, as shown in FIG. 4, comprises an input/output processing means 23 whereby data on a sector basis, such as still pictures or recording position information, are recorded on a disk 22 on a block basis with each block formed of a predetermined number of sectors, a still picture recording and reproducing means 27 which, when a still picture is to be recorded, instruct the input/output processing means 23 to record a still picture in a particular position in a still picture recording region according to the last recording position information for a particular sector in a recording position information block specified by a particular sector in a pointer block read out from the disk 22, a still picture recording position information recording and reproducing means 28 which, while managing a plurality of recording position information blocks so as to prevent the recording frequency from exceeding the maximum recording frequency assigned to a recording position information block, instructs the input/output processing means 23 to update said still picture recording position information and the recording frequency of said recording position information block and to record the updated data in sectors of the same or different recording position information block and which, when the recording position information is recorded in said different recording position information block, instructs the input/output processing means 23 to update the sector of said pointer block on the information which specifies said recording position information block, and use limit frequency setting means 26 which sets the maximum recording frequency for the disk 2.

The point in which the still picture recording and reproducing apparatus of the second embodiment differs from that of the first embodiment is that the disk drive 21 is provided with the input/output processing means which records and reproduces data provided on a sector basis, such as still pictures or recording position information, on and from the disk 22 on a block basis, each block consisting of a predetermined number of sectors.

First, the disk 22 on which it is intended to record still pictures and which is unformatted and limited in recording frequency is formatted by the still picture recording position information recording and reproducing means 28. At this time, the use limit frequency N which shows how many times the disk 22 is to be used by overwriting is inputted into the use limit frequency setting means 26 by the user. The still picture recording position information recording and reproducing means 28 calculates the total number Q of recording position information blocks, each consisting of a predetermined number of sectors, as from the use limit frequency N (as will be later described). This disk 22 is formatted as shown in FIGS. 5 and 6.

Figure 5:
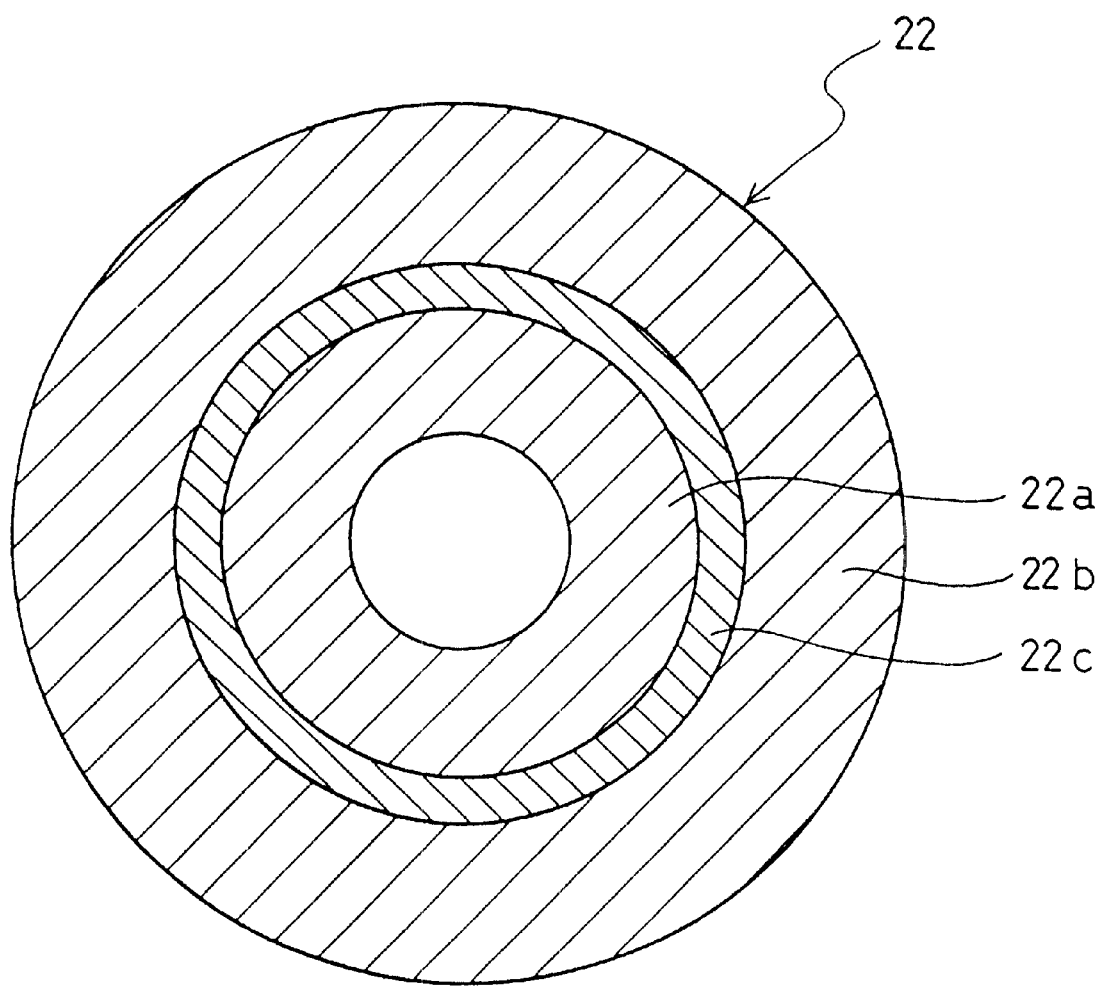
FIG. 5 is a complete view of the disk in the second embodiment.

This disk 22, as shown in FIG. 5, is formed with a still picture recording region 22a serving as a first still picture recording region on the inner peripheral side, a still picture recording region 22b serving as a second still picture recording region on the outer peripheral side, and a region 22c disposed between said still picture recording regions 22a and 22b and equidistant or substantially equidistant from the outer and inner peripheral sides, said region 22c comprising a pointer block and a group of recording position information blocks, each block consisting of a predetermined number of sectors.

Figure 6:
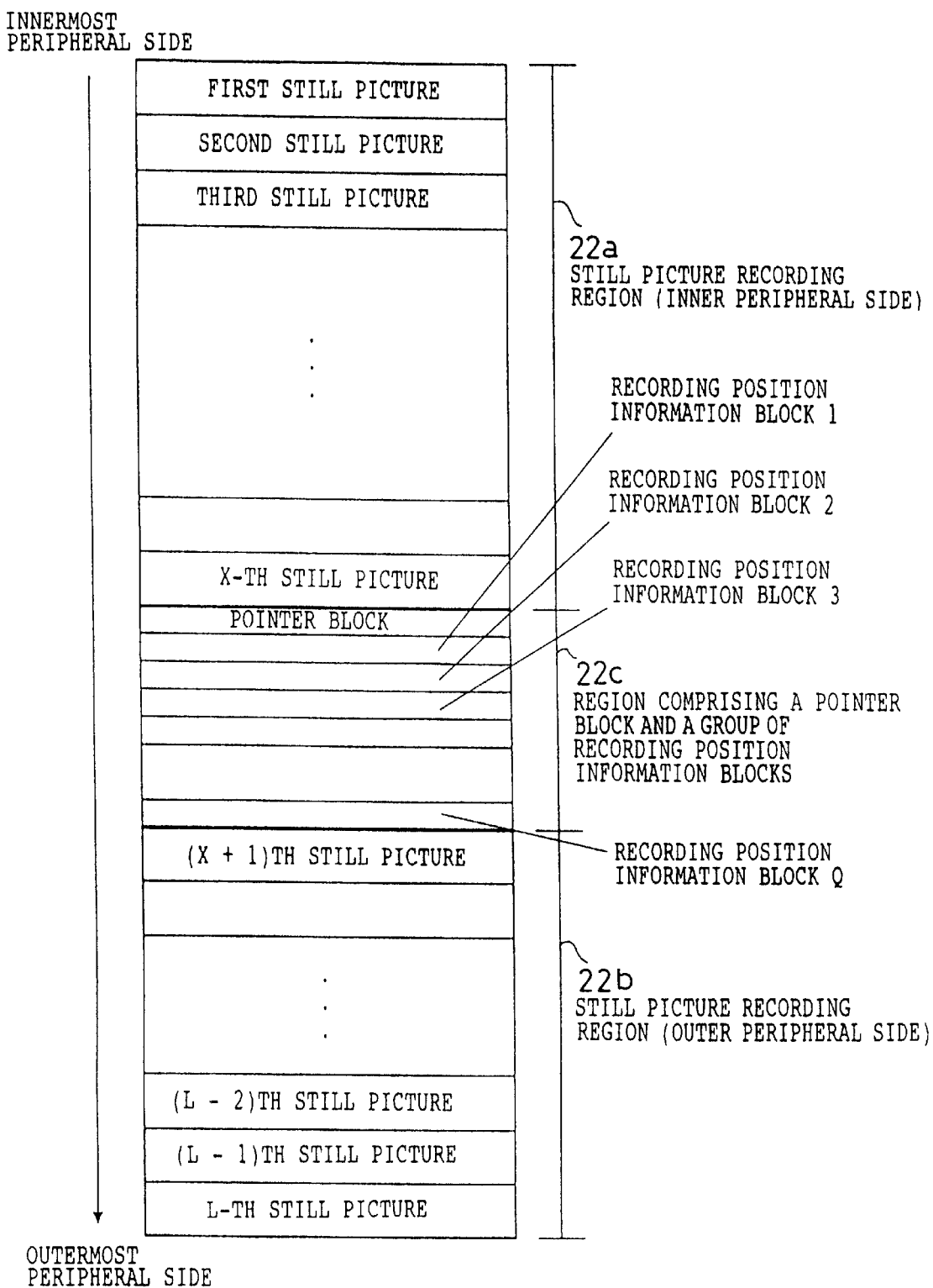
FIG. 6 is a schematic view showing the data arrangement of the disk in the second embodiment.

The data arrangement of the disk 22 is shown in FIG. 6. For example, still picture recording regions 22a and 22b for recording the first to Lth still pictures as seen from the outermost to the innermost peripheral side are secured and so is the region 22c consisting of a pointer block and Q recording position information blocks, all said sectors being interposed between the Xth still picture and the (X+1)th still picture.

FIGS. 5 and 6 are the same as FIGS. 2 and 3 except that the sectors are replaced by blocks.

The differences between the sector and the block will now be described. The smallest unit for writing and reading in and from the disk 12 was the sector in the first embodiment, but in this second embodiment, the unit for recording and reproduction is the block consisting of a predetermined number of sectors.

For example, to enhance data reliability with DVD-RAM, an error correcting system called ECC is employed, according to which system an ECC code is added to a block consisting of 16 sectors. In writing data, an ECC code is added to a block (16 sectors) and recorded in the disk 22, and in reproducing, the whole block together with the ECC code is read out and errors are corrected. This block is called the ECC block.

However, this is automatically effected by the input/output processing means 23 in the disk drive 21, and it is arranged also from the standpoint of preservation of interchangeability that from an outside interface such as an SCSI interface 24 can writing and reading on a sector basis be made.

Figures 7A, 7B:
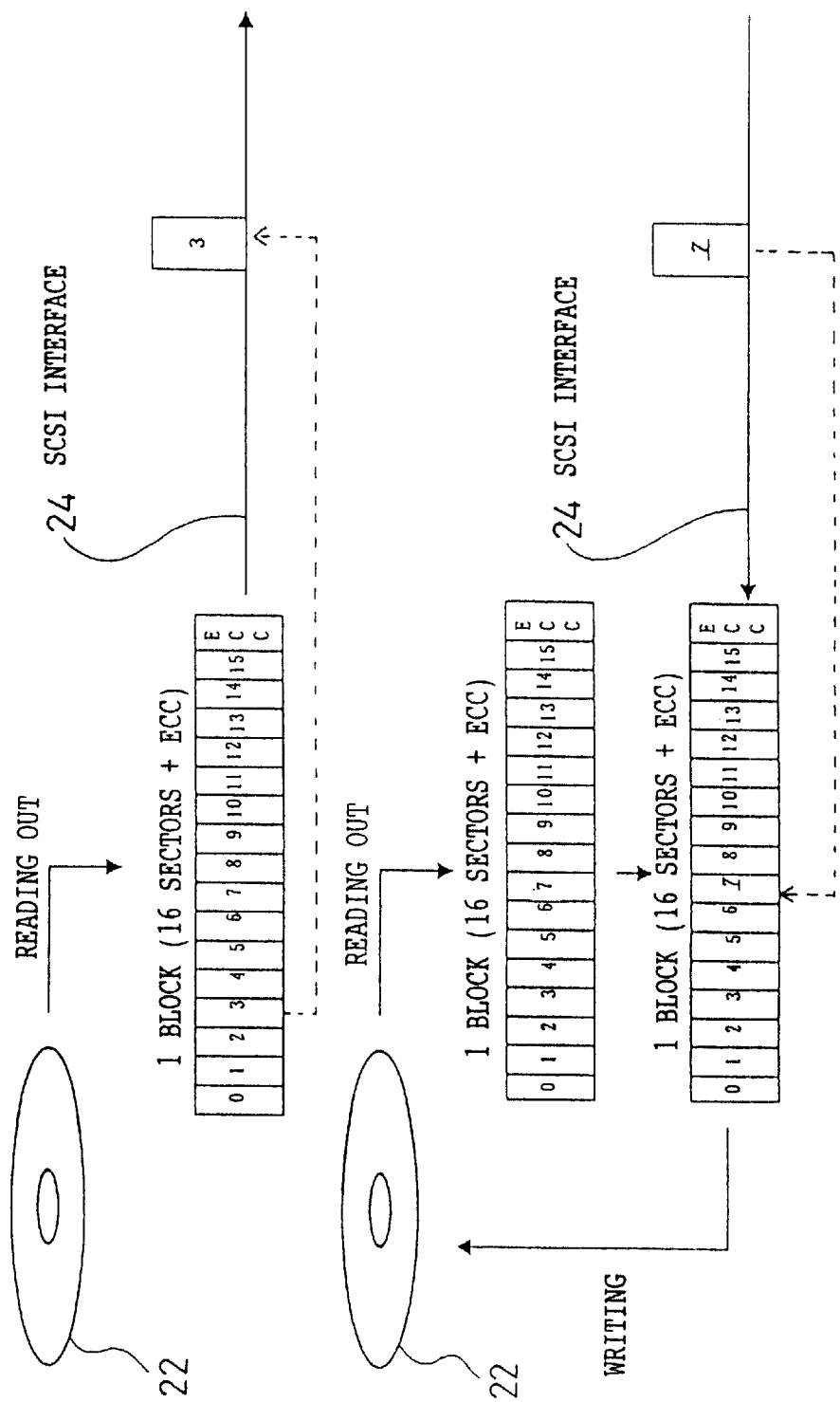
FIG. 7 is an explanatory view showing the manner of writing and reading out by using a DVD-RAM in the second embodiment.

The respective manners of reading and writing by the use of DVD-RAM will be described with reference to FIG. 7. FIG. 7(a) shows the manner of reading and FIG. 7(b) the manner of writing.

For reading, in the same manner as in the first embodiment, the reading of a sector is designated by the sector address received through the SCSI interface 24. If the designated sector is the 3rd sector in the ECC block, as shown in FIG. 7 (a), it is read out from the disk 22 on an ECC block basis to correct errors. After errors have been corrected, the 3rd sector is read out through the SCSI interface 24.

Next, consider the case of writing. As in the case of the first embodiment described previously, writing in a sector is instructed by a sector address received through the SCSI interface 24 and data is transferred. If the sector is the 7th sector in the ECC block, as shown in FIG, 7(B), the ECC code of the ECC block has to be regenerated. Accordingly, the ECC block including the 7th sector is read out from the disk 22. And after the 7th sector has been replaced and the ECC code is added anew, the ECC block is written back in the disk 22.

Thus, in both cases of reading and writing, the relevant processing is automatically performed by the input/output processing means 23 in the disk drive 21, with the result that it cannot be seen from the outside that the processing is performed on a sector basis.

However, if the case of the first embodiment provided with recording position information sectors on a sector basis is applied directly to the second embodiment, the following drawbacks arise. For example, in the above example, consider the case in which recording is made once in each of the 16 sectors in the ECC block. Then, in the case of a disk in which writing is made on a sector basis as shown in the first embodiment, recording is made, of course, only once in each sector. However, in the case of the disk 22 in which recording is internally processed on an ECC block basis, each time writing is made in a sector, it is made on an ECC block basis, so that writing is made in all sectors each 16 times, which means that the recording frequency increases 16 times as quickly as before.

Therefore, the disk 22 in which recording and reproduction are made on an ECC block basis is arranged such that the recording position information sectors are replaced by recording position information blocks, whereby it can be handled in the same way as a disk adapted for recording and reproduction on a sector basis. Actually, since control from the outside is possible only on a sector basis, the concept adopted is that one of the 16 sectors forming an ECC block is used as a recording position information sector and that every sixteenth sector is used as a recording position information sector, such Q ECC blocks being used as recording position information blocks.

The operation of recording still pictures on the disk 22 limited in recording frequency using this still picture recording and reproducing apparatus will now be described.

As described above, an unformatted disk 22 is formatted in advance by the still picture recording position information recording and reproducing means 28.

In formatting the disk 22, the use limit frequency N indicating how many times the disk is to be overwritten is inputted into the use limit frequency setting means 26 by the user, and the total number Q of recording position information blocks is found from Eq. 4 shown in the first embodiment described above. And as shown in FIG. 5, the group of recording position information blocks consisting of Q recording position information blocks each consisting of 16 sectors, and a pointer block are formed adjacent the intermediate annular region of the disk 12. The information that the first recording position information block is being used is written in a particular one of the 16 sectors of the pointer block, and the number of times of recording made in recording position information blocks (in this case, 1) and the still picture recording position information to be recorded first are written in a particular sector of the first recording position information block. In this way, the formatting of the disk 12 is completed.

To record still pictures, first, the pointer block in the disk 22 is read out by the still picture recording position information recording and reproducing means 28 so as to detect which recording position information block in the group of recording position information blocks is being used. Thereafter, a particular sector of the recording position information block indicated by the pointer block is read out to obtain the information about the position at which a still picture is to be recorded and the recording frequency. The data are fed from the still picture recording and reproducing means 27 to the disk 22 through the SCSI interface 24, and a still picture is recorded at a particular position in the still picture recording region 12a or 12b of the disk 12.

Thereafter, the data in the particular sector in the recording position information block is updated by the still picture recording position information recording and reproducing means 28. For example, suppose that the second writing has been made in the recording position information block. Then, the recording frequency of 2 and the still picture recording position information to be recorded secondly, which are updated items of information, are recorded in particular sectors of the same recording position information block.

Thus, by performing the operation of detecting the recording position information prior to the recording of a still picture and ascertaining the particular position in the still picture recording region 2a or 2b in which to record a still picture and the recording frequency of the recording position information block, the recording position information and the recording frequency of the recording position information block are ascertained at all times.

Further, it is arranged that at the point of time when the recording frequency of the recording position information block has reached M, the next recording position information block will be used thenceforth in place of the one that has been used up to now. Thus, updating and recording is made in the pointer block so that the pointer block will designate the next recording position information block.

With the arrangement thus made, it is possible to detect the recording position information recorded in a particular sector of the recording position information block formed in the disk 22 to ascertain the particular position in the still picture recording region 22a or 22b in which to record a still picture, thereby making it unnecessary to retrieve a still picture recorded in the still picture recording region so as to retrieve a recordable particular position, as in the prior art, and making it possible to shorten the retrieving time for retrieving the particular position in the still picture recording region 12a or 12b for recording still pictures.

Further, in the disk 12 limited in recording frequency, the recording position information can be recorded distributively in a plurality of recording position information blocks and the last recording position information can be reliably recorded in the disk 22 while preventing breakdown of the record in the recording position information block. Thus, the last recording position can be known at all times, whereby still pictures can be reliably recorded in the disk 22.

Further, since the still picture recording position information recording and reproducing means 28 is arranged such as to determine the total number Q of recording position information blocks on the basis of said Eq. 4 shown in the first embodiment, the last recording position information can be recorded in an optimum manner, making it possible to prevent occurrence of a breakdown of records until particular sectors of all recording position information blocks reach the maximum recording frequency. Further, the disk 22 can be used with its maximum recording frequency increased up to the recording limit frequency.

Further, since the still picture recording position information recording and reproducing means 28 is arranged such that the group of recording position information blocks and the pointer block are disposed between the still picture recording region 22a on the inner peripheral side of the disk 22 and the still picture recording region 22b on the outer peripheral side of the disk 22 and at positions equidistant or substantially equidistant from the outer and inner peripheral ends of the disk 22, the average seek time for the head of the disk drive can be reduced and the time to be taken for the recording of still pictures and the recording of recording position information can be minimized throughout the area of the disk.

In addition, in each of the embodiments described above, the recording limit frequency M is not constant owing to variations in the degree of quality guarantee offered by disk manufacturers and improvements in performance of disks to meet the change of the times: therefore it will be set to a minimum value which satisfies as many disks as possible at the time recording is to be made. Further, it may be set to a somewhat smaller value to afford some margin for error.

In each of the embodiments described above, it is arranged that when a recording information sector reaches a recording frequency of M, it is replaced by another recording information sector. However, the same effectiveness can be obtained when recording information sectors are successively used such that each time one recording information sector reaches a recording frequency of Z (=less than M) which will not cause frequent updating and recording of the pointer sector, it is replaced by another; thus, Q recording information sectors are evenly used in rotation until each reaches M.

In each of the embodiments described above, the use limit frequency N is inputted from the outside; however, the same effectiveness can be obtained when the still picture recording position information recording and reproducing means is arranged such that the number Q is determined at the beginning as when the use of recorded still pictures is clear and the use limit frequency N is known in advance; thus, input from the outside can be omitted.

What is claimed is:

1. A method for recording still pictures on a disk, wherein in recording still pictures on a disk limited in recording frequency, the method comprises the steps of
    forming said disk with a still picture recording region for recording still pictures, a plurality of recording position information sectors in which recording position information indicating the position of a still picture to be recorded on the disk is recorded, and a pointer sector which specifies a recording position information sector having the last recording position information written therein,
    when it is desired to record a still picture, recording it in a particular position in said still picture recording region according to the last recording position information written in a recording position information sector specified by said pointer sector, managing said plurality of recording position information sectors so as to prevent the recording frequency of a recording position information sector from exceeding the maximum recording frequency, updating the recording position information about said still picture and the recording frequency of said recording position information sector and recording them in the same or different recording position information sector, and, when the recording position information is recorded in said different recording position information sector, updating said pointer sector on the information which specifies this recording position information sector.

2. A method for recording still pictures on a disk, wherein in recording still pictures on a disk limited in recording frequency, the method comprises the steps of
    forming said disk with a still picture recording region for recording still pictures, a plurality of recording position information blocks in which recording position information indicating the position of a still picture to be recorded on the disk is recorded in a particular one of a predetermined number of sectors, and a pointer block whereby information which specifies a recording position information block having the last recording position information written therein is recorded in a particular one of a predetermined number of sectors,
    when it is desired to record a still picture, recording it in a particular position in said still picture recording region according to the last recording position information written in a particular sector of a recording position information block specified by said pointer block, managing said plurality of recording position information blocks so as to prevent the recording frequency of a recording position information block from exceeding the maximum recording frequency, updating the recording position information about said still picture and the recording frequency of said recording position information block and recording them in a sector of the same or different recording position information block, and, when the recording position information is recorded in said different recording position information block, updating said pointer block on the information which specifies this recording position information block.

3. An apparatus for recording and reproducing still pictures on and from a disk, by using as a recording medium a disk limited in recording frequency, said apparatus comprising
    a still picture recording and reproducing means which, when it is desired to record a still picture, records it in a particular position of a still picture recording region according to the last recording position information recorded in a recording position information sector specified by a pointer sector read out from the disk, and
    a still picture recording position information recording and reproducing means which, while managing a plurality of recording position information sectors so as to prevent the recording frequency of a recording position information sector from exceeding the maximum recording frequency, updates the recording position information about said still picture and the recording frequency of said recording position information sector and records them in the same or different recording position information sector, and which, when the recording position information is recorded in said different recording position information sector, updates said pointer sector on the information which specifies this recording position information sector.

4. An apparatus for recording and reproducing still pictures on and from a disk as set forth in claim 3, wherein said still picture recording position recording and reproducing means is arranged such that let the maximum number of still pictures recordable on the disk be L (which is a positive integer), the recording limit frequency of the disk be M (which is a positive integer), and the maximum recording frequency of a single recording position information sector be N (which is an integer between 1 and M), and let the total number Q of recording position information sectors be a value calculated from the equation $Q \geqq (N \times L/M)$, then if the total number Q is a number containing a decimal point, the number is rounded up to the nearest integer and an integer equal to or greater than said nearest integer is used as the value of Q.

5. An apparatus for recording and reproducing still pictures on and from a disk as set forth in claim 3, wherein said still picture recording position recording and reproducing means is arranged such that a group of recording position information sectors and a pointer sector are formed between a first still picture recording region formed on the inner peripheral side of the disk and a second still picture recording region formed on the outer peripheral side of the disk and equidistantly or substantially equidistantly from the outer and inner peripheral ends of the disk.

6. An apparatus for recording and reproducing still pictures on and from a disk, by using as a recording medium a disk limited in recording frequency, said apparatus comprising
    an input/output processing means for recording and reproducing data on a sector basis, such as a still picture or recording position information, on said disk on the basis of a block which consists of a predetermined number of sectors,
    a still picture recording and reproducing means which, when recording a still picture, instructs said input/output processing means to record a still picture in a particular position of the still picture recording region specified by a particular sector of the pointer block read out from the disk, and
    a still picture recording position information recording and reproducing means which, while managing a plurality of recording position information blocks so as to prevent the recording frequency of a recording position information block from exceeding the maximum recording frequency, instructs said input/output processing means to update the recording position information about said still picture and the recording frequency of said recording position information block and to record them in a sector of the same or different recording position information block, and which, when the recording position information is recorded in said different recording position information block, instructs said input/output processing means to update said pointer block on the information which specifies this recording position information block.

7. An apparatus for recording and reproducing still pictures on and from a disk as set forth in claim 6, wherein said still picture recording position recording and reproducing means is arranged such that let the maximum number of still pictures recordable on the disk be L (which is a positive integer), the recording limit frequency of the disk be M (which is a positive integer), and the maximum recording frequency of a single recording position information block be N (which is an integer between 1 and M), and let the total number Q of recording position information blocks be a value calculated on the basis of the equation $Q \geq (N \times L/M)$, then if the total number Q is a number containing a decimal point, the number is rounded up to the nearest integer and an integer equal to or greater than said nearest integer is used as the value of Q.

8. An apparatus for recording and reproducing still pictures on and from a disk as set forth in claim 6, wherein the input/output processing means is arranged to record and reproduce data, such as a still picture or recording position information, on and from the disk on an ECC block basis, wherein a block consisting of a predetermined number of sectors has an ECC code added thereto for correction of errors.

9. An apparatus for recording and reproducing still pictures on and from a disk as set forth in claim 6, wherein said still picture recording position recording and reproducing means is arranged such that a pointer block and a group of recording position information blocks are formed between a first still picture recording region formed on the inner peripheral side of the disk and a second still picture recording region formed on the outer peripheral side of the disk and equidistantly or substantially equidistantly from the outer and inner peripheral ends of the disk.

10. An apparatus for recording and reproducing still pictures on and from a disk as set forth in claim 3, including a use limit frequency setting means which sets a maximum recording for the disk.

* * * * *